(12) United States Patent
Chen

(10) Patent No.: US 7,458,696 B2
(45) Date of Patent: Dec. 2, 2008

(54) ADJUSTING STRUCTURE OF A LASER INDICATOR OF A SAWING MACHINE

(75) Inventor: Hsin-Chin Chen, Taipei (TW)

(73) Assignee: Sean & Stephen Corp., Taipei (TW)

( * ) Notice: Subject to any disclaimer, the term of this patent is extended or adjusted under 35 U.S.C. 154(b) by 125 days.

(21) Appl. No.: 11/520,574

(22) Filed: Sep. 14, 2006

(65) Prior Publication Data

US 2008/0068840 A1 Mar. 20, 2008

(51) Int. Cl.
*F21V 33/00* (2006.01)
(52) U.S. Cl. .................. 362/89; 362/259; 362/200; 362/205; 362/802; 362/339; 83/520; 83/521
(58) Field of Classification Search .............. 362/89, 362/259, 294, 200, 205, 339, 802; 83/520, 83/521
See application file for complete search history.

(56) References Cited

U.S. PATENT DOCUMENTS 7,029,149 B2 * 4/2006 Tung ...................... 362/259
7,226,179 B2 * 6/2007 Garcia et al. ................. 362/89
2002/0131267 A1 * 9/2002 Van Osenbruggen ........ 362/109

\* cited by examiner

*Primary Examiner*—Stephen F Husar
*Assistant Examiner*—Jessica L McMillan
(74) *Attorney, Agent, or Firm*—Rosenberg, Klein & Lee

(57) ABSTRACT

A laser indicator is secured on a rotating shaft of a sawing machine, on which rotating shaft a saw is fitted; the laser indicator consists of a base, an upper cover, a laser module, and a threaded adjusting element passed through a screw hole of the upper cover; the laser module is pivoted to the base, and subjected to elastic force of an elastic member; the adjusting element is pressed against the laser module such that orientation of the laser module can be adjusted by means of turning the adjusting element; therefore, if the laser beam emitted from the laser module fails to head towards exactly the same direction as the blade of the saw, the user is allowed to turn the adjusting element to adjust the laser module to a correct position.

9 Claims, 6 Drawing Sheets

ADJUSTING STRUCTURE OF A LASER INDICATOR OF A SAWING MACHINE

BACKGROUND OF THE INVENTION

1. Field of the Invention

The present invention relates to an adjusting structure of a laser indicator of a sawing machine, more particularly one, which allows position of the laser module to be adjusted such that a laser beam emitted from the laser module will head in a correct direction, i.e. towards the same direction as the saw blade of the sawing machine.

2. Brief Description of the Prior Art

Cutting machines and sawing machines are usually equipped with a laser indicator, which emits a laser beam for marking the portion of a work piece to be cut/sawed such that a cutting/sawing process can be carried out accurately.

A conventional laser indicator is fitted on a rotating shaft of a sawing machine, on which a blade is secured. The laser indicator will emit a laser beam heading towards the same direction as the blade of the saw; thus, it is ensured that the saw blade will cut the intended portion of a work piece, which is currently marked by the laser beam, after the rotating shaft starts rotating. In other words, a sawing process can be carried out accurately owing to the laser indicator.

However, the above-mentioned laser indicator has a disadvantage: a laser module of the above-mentioned laser indicator is fixed on a circuit board by means of solder welding therefore the orientation of the laser module can't be adjusted for changing direction of the laser beam even if the laser beam fails to head towards the same direction as the saw blade. Consequently, the whole laser indicator becomes useless, and has to be discarded, resulting in significant undesirable increase in the manufacturing cost.

SUMMARY OF THE INVENTION

It is a main object of the invention to provide an improvement on a laser indicator of a sawing machine to overcome the above-mentioned problems. The laser indicator is securely fitted on a rotating shaft of a sawing machine, on which rotating shaft a saw is securely fitted.

The laser indicator consists of a base, an upper cover, a laser module, and a threaded adjusting element passed through a screw hole of the upper cover. The laser module is pivoted to the base, and subjected to elastic force of an elastic member. The adjusting element is pressed against the laser module such that orientation of the laser module can be adjusted by means of turning the adjusting element. If the laser beam from the laser module fails to head towards exactly the same direction as the blade of the saw, the user is allowed to turn the adjusting element to adjust the laser module to a correct position.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
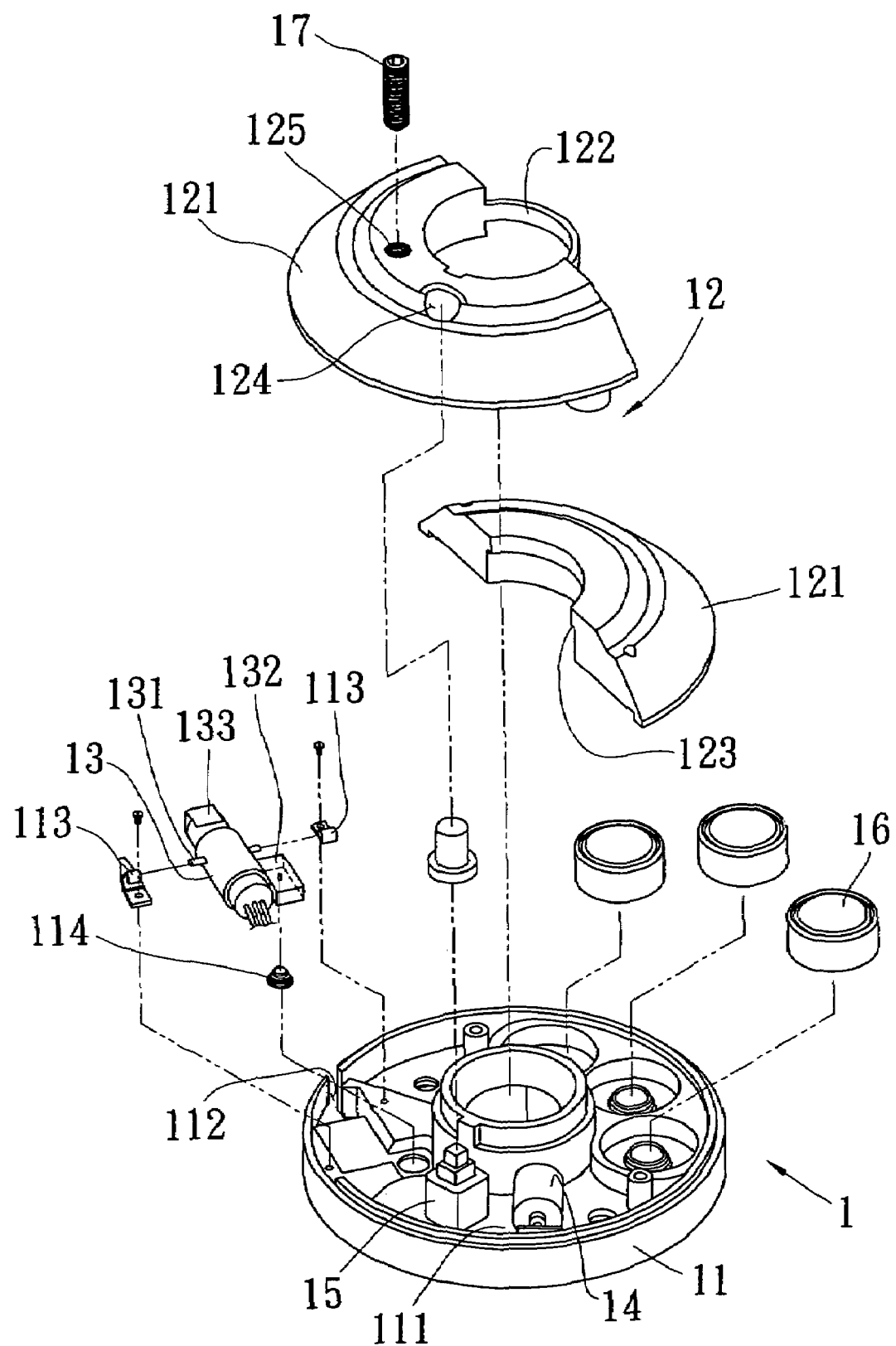
FIG. 1 is an exploded perspective view of the laser indicator of the present invention.
Figure 2:
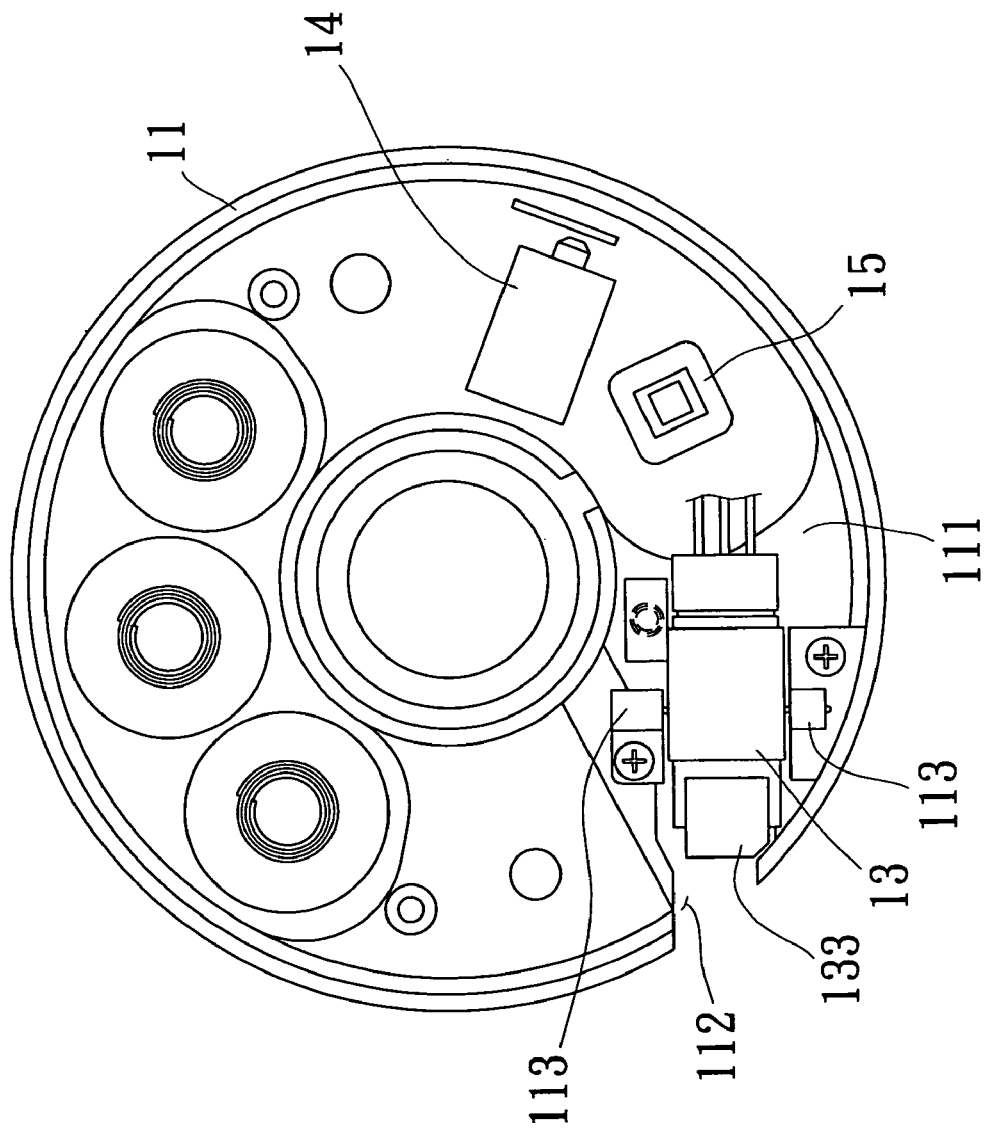
FIG. 2 is a top view of the present invention.
Figure 3:
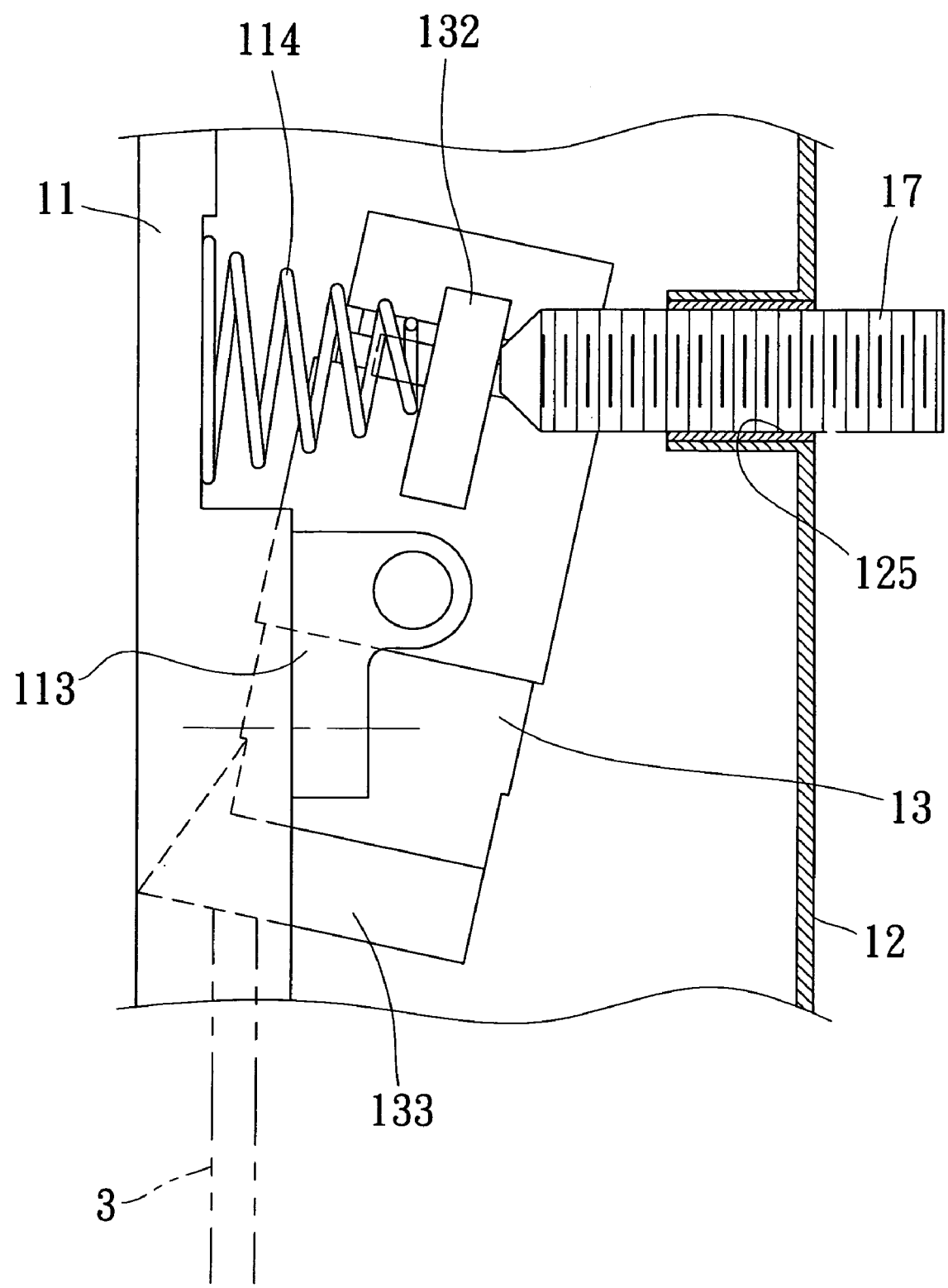
FIG. 3 is a sectional view of the present invention.
Figure 4:
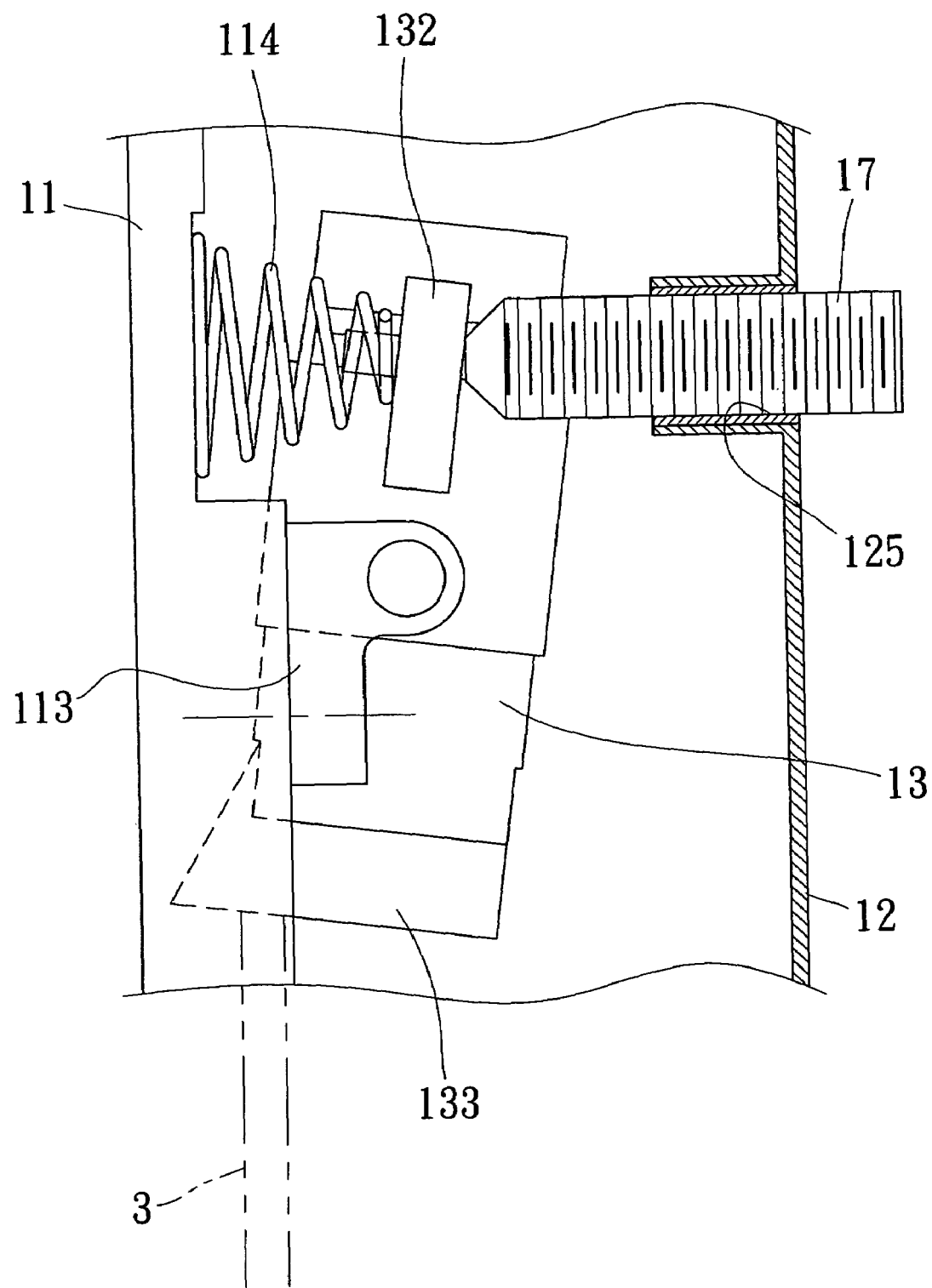
FIG. 4 is a view showing use of the present invention (1)
Figure 5:
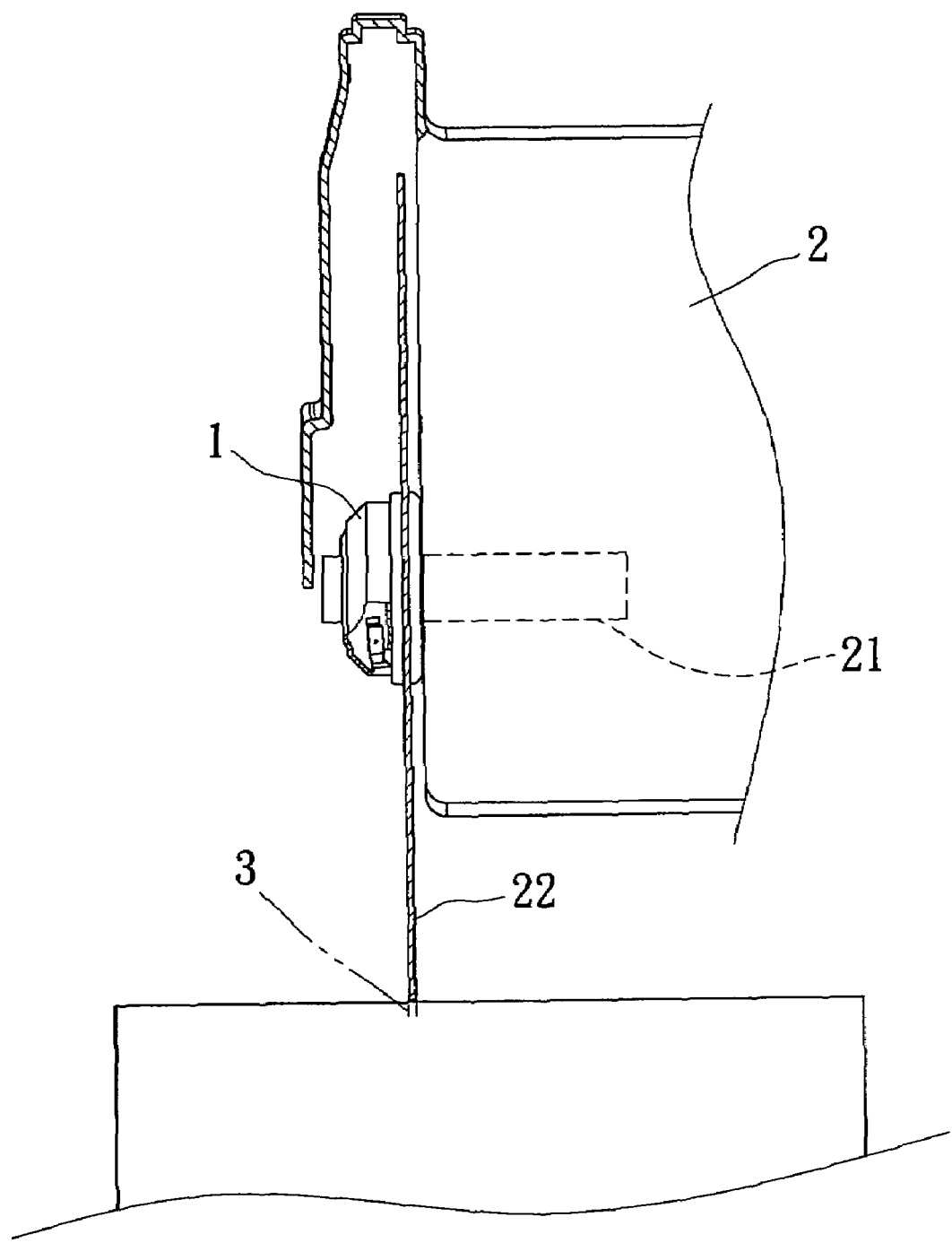
FIG. 5 is a view showing use of the present invention (2)
Figure 6:
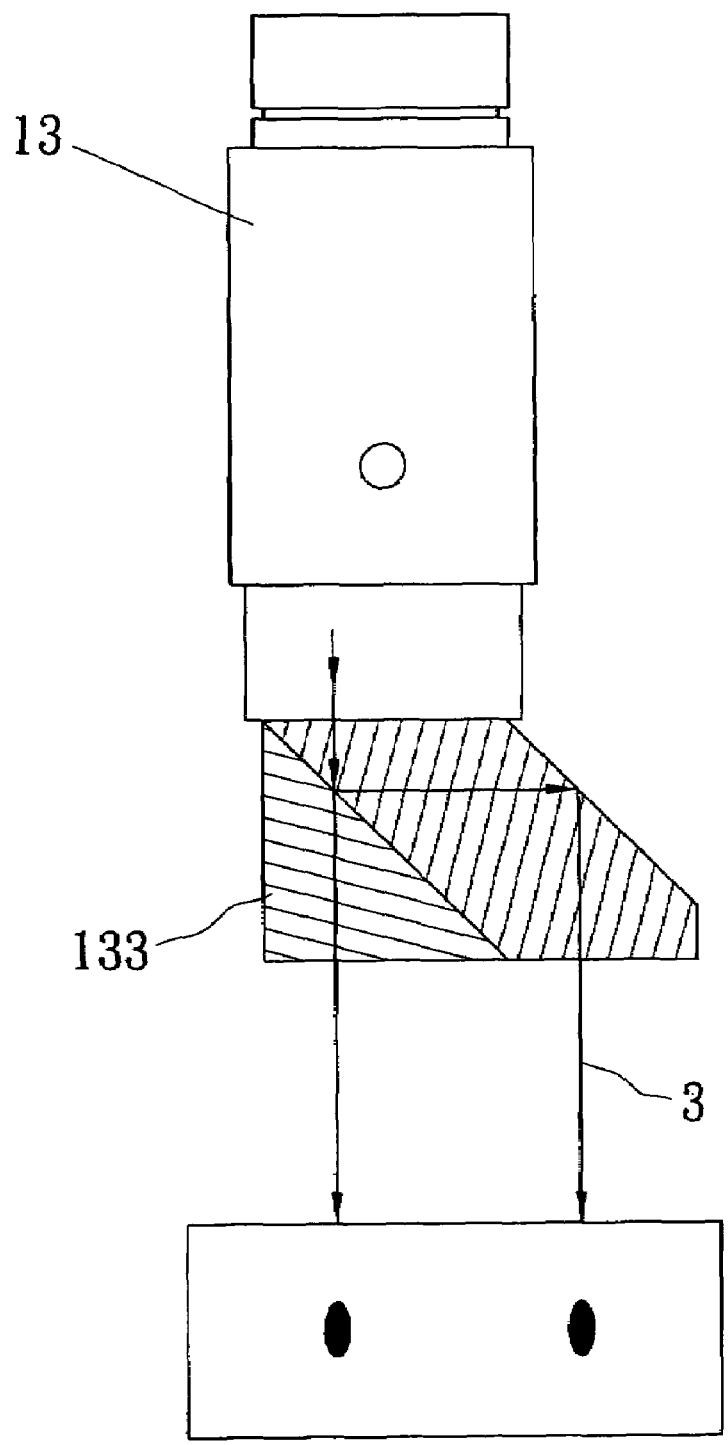
FIG. 6 is a view showing use of the present invention (3).

Referring to FIGS. 1 and 3 to 5, a preferred embodiment of a laser indicator 1 of the present invention consists of a base 11, an upper cover 12, a circuit board 111, a laser module 13, a vibrating switch 14, a manual switch 15, a battery set 16, and an adjusting element 17. The laser indicator 1 is securely fitted on a rotating shaft 21 of a sawing machine 2, to which blade of a saw 22 is securely fitted.

The upper cover 12 and the base 11 are coupled together in a separable manner. The circuit board 111 is securely fitted on the base 11. The battery set 16 is connected to the circuit board 111, and the battery set 16, the laser module 13, the vibrating switch 14, and the manual switch 15 together comprise a circuit. The base 11 has a through hole 112 thereon for allowing a laser beam 3 emitted from the laser module 13 to pass through.

The laser module 13 has a pivotal post-shaped portion 131 on each of two lateral sides thereof, a protruding ear portion 132 on one lateral side, and a prism 133 fitted on a laser emitting end thereof. The base 11 has two opposing fixed pieces 113 fixed thereon, and the laser module 13 is pivoted to the opposing fixed pieces 113 at the pivotal post-shaped portions 131 thereof. An elastic member 114 is fitted on the base 11 to exert elastic force on the protruding ear portion 132 of the laser module 13. The prism 133 can be one capable of making the laser beam from the laser module 13 form single mark on a work piece. Or alternatively, the prism 133 can be one capable of making the laser beam emitted from the laser module 13 form two marks on a work piece, between which marks the distance is equal to the thickness of the blade of a saw 22 of the sawing machine 2.

The upper cover 12 consists of first and second covering parts 121, which are coupled together in a separable manner. The first covering part 121 has a semi-ring shaped fitting portion 122, and the second covering part 121 has a semi-ring shaped fitting trench 123, on which the semi-ring shaped fitting portion 12 of the first covering part 121 is fitted. Furthermore, the first covering part 121 has a through hole 124, and an adjusting screw hole 125 thereon. The adjusting element 17 is passed through the adjusting screw hole 125 to exert a pressing force on the protruding ear portion 132 of the laser module 13; thus, position of the laser module 13 can be adjusted by means of turning the adjusting element 17 to change position of the adjusting element 17 in relation to the adjusting screw hole 125. The manual switch 15 sticks out through the through hole 124 of the first covering part 121 of the upper cover 12; thus, the user is allowed to press the manual switch 15. The second covering part 121 covers the battery set 16, and it can be separated from the base 11 and the first covering part 121 for battery change.

When the rotating shaft 21 of the sawing machine 2 is rotating, internal elements of the vibrating switch 14 will vibrate and move to "ON" position to close the circuit consisting of the laser module 13, and the battery set 16. Furthermore, the manual switch 15 can be used to turn on the laser module 13 instead of the vibrating switch 14 when the rotating shaft 21 and the vibrating switch 14 are still.

Therefore, when the rotating shaft 21 of the sawing machine 2 starts rotating, the laser indicator 1 will rotate together with the rotating shaft 21, and the vibrating switch 14 will move to the "ON" position to close the circuit. Consequently, the laser module 13 is powered, and emits a laser beam, which will through the prism 133 and the through hole 112 of the base 11, and head towards exactly the same direction as the blade of the saw 22 of the sawing machine 2.

Therefore, an intended portion of a work piece will certainly be cut with the saw 22 if the work piece is placed in such a position that the laser beam travels onto the intended portion of the work piece. In other words, with the help of the laser indicator, the sawing process can be carried out accurately.

If the laser beam from the laser module 13 fails to head towards exactly the same direction as the blade of the saw 22, the user should turn the adjusting element 17 to adjust position of the adjusting element 17 in relation to the adjusting screw hole 125 of the upper cover 12 such that the laser module 13 pivots on the fixed pieces 113 to a correct position, in which position the laser beam emitted from the laser module 13 will head towards exactly the same direction as the blade of the saw 22.

After the laser module 24 is adjusted to a new position, the user is allowed to turn on the laser module 13 by means of pressing the manual switch 15, and check whether the laser beam emitted from the laser module 13 heads towards exactly the same direction as the blade of the saw 22 of the sawing machine 2. In other words, the user is allowed to check whether the laser beam heads towards exactly the same direction as the blade of the saw 22 when the rotating shaft 21 of the sawing machine 2 is still. Therefore, the laser module is relatively convenient to use.

The user is allowed to change battery after he separates the second covering part 121 of the upper cover 12 from the base 11 and the first covering half part 121. In other words, it's not necessary for the user to remove the whole upper cover 12; if the whole upper cover 12 were removed for battery change, the user would have to fit the upper cover 12 back to the base 11 very carefully for the various parts of the laser indicator to be in incorrect position in relation to each other.

From the above description, it can be seen that the laser indicator of the present invention has the following advantages:

1. The laser indicator is relatively convenient to use because the laser module is pivoted on the fixed pieces of the base and subjected to elastic force of the elastic member, and the user is allowed to turn the adjusting element to adjust the laser module to a correct orientation, in which orientation the laser beam emitted from the laser module will head towards exactly the same direction as the blade of the saw of the sawing machine.

2. The upper cover of the laser indicator consists of two separable covering parts. Therefore, it's not necessary for the user to remove the whole upper cover in battery change, and the laser indicator is relatively convenient to use.

3. The prism can be one capable of making the laser beam from the laser module form single mark on a work piece. Or alternatively, the prism can be one capable of making the laser beam form two marks on a work piece, between which marks the distance is equal to the thickness of the saw. Therefore, the laser indicator is convenient to use.

What is claimed is:

1. An adjusting structure of a laser indicator of a sawing machine, which laser indicator is securely fitted on a rotating shaft of a sawing machine; said rotating shaft having a saw securely fitted thereto;

said laser indicator comprising;

a base, the base having two opposing fixed pieces fixed thereon;

an upper cover, the upper cover and the base being coupled together in a separable manner;

a circuit board secured on the base;

a battery set;

a laser module; the circuit board, the laser module, and the battery set being connected together to comprise a circuit; the base having a though hole for allowing a laser beam emitted from the laser module to pass through; the laser module having a pivotal post-shaped portion on each of two lateral sides thereof; the laser module being pivoted to the opposing fixed pieces on the base at the pivotal post-shaped portions thereof;

a prism fitted on a laser emitting end of the laser module;

an elastic member exerting elastic force on the laser module; and an adjusting element, the adjusting element being fitted to the upper cover and touching the laser module.

2. The adjusting structure of a laser indicator of a sawing machine as recited in claim 1, wherein the laser module has a protruding ear portion on one lateral side, and the protruding ear portion touches the elastic member and the adjusting element.

3. The adjusting structure of a laser indicator of a sawing machine as recited in claim 1, wherein the prism will make a laser beam emitted from the laser module form single mark on a work piece.

4. The adjusting structure of a laser indicator of a sawing machine as recited in claim 1, wherein the prism will make a laser beam emitted from the laser module form two marks on a work piece, between which marks a distance is equal to a thickness of the saw of the sawing machine.

5. The adjusting structure of a laser indicator of a sawing machine as recited in claim 1 further having a vibrating switch, which is connected to the circuit board to comprise a circuit together with the laser module and the battery set.

6. The adjusting structure of a laser indicator of a sawing machine as recited in claim 1 further having a manual switch, which is connected to the circuit board to comprise a circuit together with the laser module and the battery set.

7. The adjusting structure of a laser indicator of a sawing machine as recited in claim 1 further having bath a vibrating switch and a manual switch, which are connected to the circuit board to comprise a circuit together with the laser module and the battery set.

8. The adjusting structure of a laser indicator of a sawing machine as recited in claim 1, wherein the upper cover consists of two covering parts; the covering parts being coupled together in a separable manner; a first one of the covering parts having a semi-ring shaped fitting portion; other one of the covering parts having a semi-ring shaped fitting french, on which the semi-ring shaped fitting portion of said first covering part is fitted.

9. The adjusting structure of a laser indicator of a sawing machine as recited in claim 8, wherein one of the covering parts of the upper cover is arranged over the battery set.

\* \* \* \* \*